United States Patent [19]
Kunz et al.

[11] 3,775,185
[45] Nov. 27, 1973

[54] FUEL CELL UTILIZING FUSED THALLIUM OXIDE ELECTROLYTE

[75] Inventors: Harold Russell Kunz; Myles Alexander Walsh, both of Vernon, Conn.

[73] Assignee: United Aircraft Corporation, East Hartford, Conn.

[22] Filed: Jan. 13, 1971

[21] Appl. No.: 106,206

[52] U.S. Cl............... 136/86 R, 136/86 E, 136/153
[51] Int. Cl..................... H01m 27/20, H01m 27/16
[58] Field of Search.................... 136/83 T, 153, 86; 252/62.3, 63.5

[56] References Cited
UNITED STATES PATENTS

| 3,489,610 | 1/1970 | Berger et al................... 136/153 X |
|---|---|---|
| 3,497,389 | 2/1970 | Berger et al....................... 136/86 F |
| 3,146,131 | 8/1964 | Linden et al...................... 136/86 F |
| 3,281,273 | 10/1966 | Oser................................. 136/86 F |
| 3,360,401 | 12/1967 | Grasselli et al.................... 136/86 E |

FOREIGN PATENTS OR APPLICATIONS

| 222,283 | 12/1957 | Australia............................ 136/86 R |
| 1,070,937 | 6/1967 | Great Britain....................... 136/153 |

Primary Examiner—A. B. Curtis
Attorney—Brufsky, Staas, Breiner and Halsey

[57] ABSTRACT

A fuel cell system for the direct generation of electricity from a fuel and oxidant is described employing an electrolyte containing thallium oxide. This fuel cell system will operate efficiently using air as an oxidant and impure hydrogen or a hydrocarbon as the fuel at relatively low temperatures, i.e., 250°–300°C.

8 Claims, 1 Drawing Figure

PATENTED NOV 27 1973 3,775,185
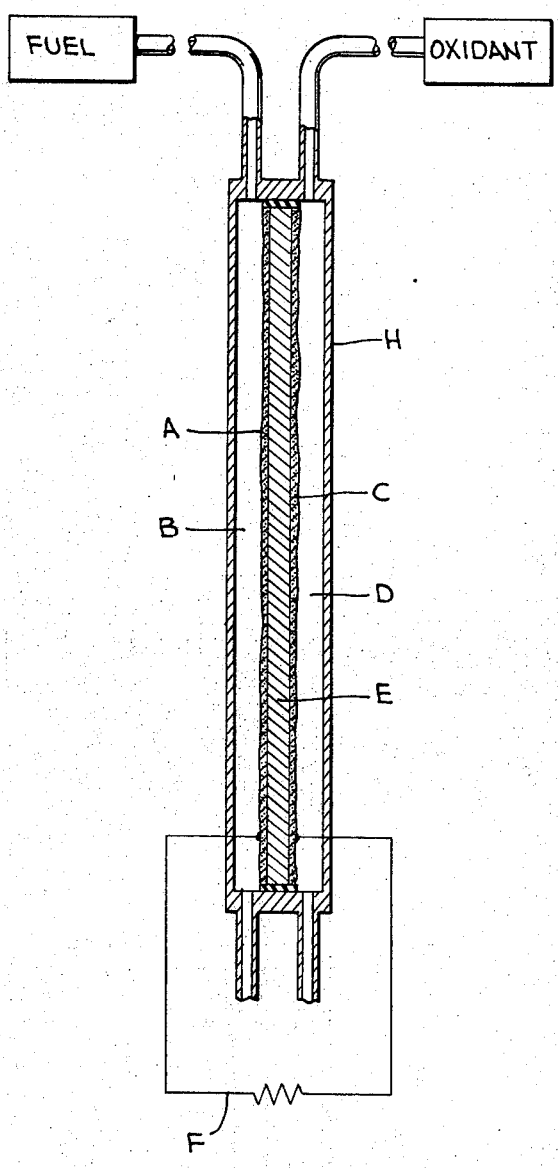

FUEL CELL UTILIZING FUSED THALLIUM OXIDE ELECTROLYTE

FIELD OF INVENTION

This invention relates to fused electrolyte fuel cells, i.e., fuel cells for the direct generation of electricity from a fuel and oxidant, in which the electrolyte is in a fused condition. More particularly, this invention relates to a fuel cell in which the electrolyte contains fused thallium oxide. This novel electrolyte permits efficient operation of a fuel cell on air as the oxidant and impure hydrogen or a hydrocarbon as the fuel at relatively low temperatures.

DESCRIPTION OF THE PRIOR ART

It is recognized in the art that fuel cells for the direct generation of electricity from a fuel and oxidant using a molten carbonate electrolyte afford numerous advantages, both in stability and performance of the fuel cells. No precious metals are needed for enhancement of the electrode reactions because of the operating temperature of the cells, i.e., 600° to 800°C. The operating temperature level is also significantly less than that required for adequate ionic conduction, i.e., 1,000°C, in solid electrolyte cells using doped zirconia as electrolyte. This temperature difference has an important effect on materials of construction. Also, the electrolyte remains invariant when air or a fuel containing impurities or hydrocarbons are used. However, in order to obtain high performance in a molten carbonate fuel cell, carbon dioxide must be added to the air stream to enable carbonate ions to be formed at the air electrode.

OBJECTS OF THE INVENTION

Accordingly, it is an object of this invention to provide a fused salt electrolyte fuel cell system which will operate efficiently on air or impure fuels without the addition of carbon dioxide.

Another object of this invention is to provide a fuel cell system operable on air and impure fuels in which the activation polarization is greatly decreased.

A further object of this invention is to provide a fuel cell system in which the electrolyte contains fused thallium oxide.

It is a further object of this invention to provide a fused electrolyte fuel cell system which can be operated efficiently at temperatures of about 120° to 300°C.

These and other objects will become more apparent from the following detailed description, with particular emphasis being placed on the working embodiments.

SUMMARY OF THE INVENTION

The objects of this invention are accomplished by providing a fuel cell system in which the electrolyte contacting the fuel and oxygen electrodes contains thallium oxide, or mixtures of thallium oxide with materials with which it forms eutectics, such as $Tl_2O/(TlNO_3)_4/(Ag NO_3)_4$ More specifically, a fuel cell is constructed utilizing a fused thallium oxide electrolyte, or a eutectic of thallium oxide in conjunction with known electrodes such as a platinum doped nickel fuel electrode, and a platinum-gold alloy doped nickel oxidant electrode. In operation, the temperature of the cell is maintained at from about 120° to 300°C, depending on the electrolyte composition, and the cell fed with air as the oxidant and impure hydrogen or hydrocarbon as the fuel. The thallium oxide electrolyte in the molten or fused state disassociates according to the reaction $Tl_2O \rightleftharpoons Tl^+ + TlO^-$ At the fuel cell anode, the fuel (hydrogen by way of example but not by way of limitation) reacts with $TlO^-$ according to the net electrochemical reaction:

$H_2 + TlO^- \rightarrow H_2O + Tl^+ + 2e^-$

The $Tl^+$ formed at the anode diffuses in an operating cell towards the cathode, driven by voltage and, in mixtures, concentration gradients. At the cathode, the following net reaction will take place:

$2e^- + Tl^+ + \frac{1}{2}O_2 \rightarrow TlO^-$

In an operating fuel cell, the $TlO^-$ ions formed at the cathode will migrate to the anode as a result of voltage, and, in mixtures, concentration gradients.

Essentially, therefore, the novel fused electrolyte of the present invention, while acting as an ion-conductive medium, actually takes part in the reaction of the cell, but as a result of the reaction, is continually replenished in order that effectively it maintains the identical stable composition over continuous and prolonged operation. The electrolyte is stable when employing air as the oxidant and in the presence of impurities in the fuel. Accordingly, since the cell can be operated on air and impure fuels, as well as being operated at relatively low temperatures, the shortcomings of the known prior art solid or fused electrolyte fuel cells are substantially minimized.

Fuel cells employing $Tl_2O$ as the electrolyte will operate on air and impure hydrogen or a carbonaceous fuel efficiently at temperatures of above 300°C, the melting point of $Tl_2O$. However, the operating temperature can be lowered somewhat, without loss of efficiency, by mixing the $Tl_2O$ with a material which will form a eutectic with $Tl_2O$. Suitable eutectic mixtures are $Tl_2O/(TlNO_3)_4/(Ag NO_3)_4$ which melts at about 90°C and permits operation of a fuel cell at temperatures as low as 120°C.

It should be understood that although the above theoretical mechanism of the cell reaction is believed to be correct, the invention is not to be limited thereby. Regardless of the correctness of the theoretical explanation, an increase in the rate of electrochemical reaction of the cell at low temperatures and the stability of the cell over prolonged periods is obtained through the use of the fused $Tl_2O$ electrolyte.

DRAWING AND DETAILED DESCRIPTION

A fuel cell falling within the scope of this invention is shown in the drawing. In the drawing, the cell comprises a housing H, made of any suitable material such as stainless steel, a fused $Tl_2O$ containing electrolyte disk E, an anode A, and a cathode C, in contact with opposite surfaces of the electrolyte disk. An oxidant such as air is fed from an oxidant supply to chamber D, where it contacts the cathode C. A carbonaceous fuel containing a mixture of methane, propane, butane and octane, is fed from a fuel storage to chamber B where it contacts the anode A. Excess oxidant and fuel are exhausted from the cell and electrical energy removed through circuit F.

Electrolyte disk E can be cast by pouring the completely fused $Tl_2O$ or a eutectic mixture of $Tl_2O$ into heated cast iron moulds coated with graphite. If desired, closed end tubes can be easily made by pouring the melt into a hot, cylindrical grahpite-coated cast iron mould and quickly inserting a heated, tapered graphite-coated cast iron plunger into the melt, with sufficient clearance to give the desired wall thickness. Alternatively, a centrifugal casting method can be employed. Cast electrolytes made in the aforesaid way have adequate strength for use in stacked electrolyte fuel cells particularly when they are employed between rigid electrodes. The structural integrity of such electrolyte disks can be improved by adding to the melt a small amount, i.e., up to about 15 percent, of finely divided, inert solid such as thorium oxide, cerium oxide, magnesium oxide, or the like, and producing a finer-grained crystalline structure. Alternatively, the electrolyte disk E can comprise a porous carrier, such as a porous ceramic body, and the thallic oxide or eutectic mixture thereof held in the pores of the carrier. These structures are normally stronger.

The electrodes employed in the present fuel cell system are any of the prior art electrodes which will withstand operating conditions of cells operated in the temperature range of from about 250° to 300°C. These include rigid pre-formed electrodes such as bi-porous nickel, or lithiated nickel structures; plates or disks of palladium/gold alloys; doped carbon bodies, or electrodes which are applied directly to the electrolyte disk by spraying or rolling a layer of catalytic material onto the opposite faces of the electrolyte matrix. These electrodes will normally comprise a catalytic material such as the pure elements, alloys, oxides, or mixtures thereof, belonging to Groups IB, IIB, IV, V, VI, VII, and VIII of the periodic table and the rare earth elements. The Group IB AND VIII metals are preferred. These metals can be used in combination with a polymer binder such as a polyhalogenated ethylene, i.e., polytetrafluoroethylene, which will withstand the operating temperatures of the cell. The electrodes are preferably applied to the electrolyte disk by pressing, rolling, or spraying of a dispersion of the electrochemically active metal and a fluorocarbon binder onto the external surfaces of the electrolyte matrix.

Any of the carbonaceous fuels and hydrogen can be used as the fuel in the fuel cell of the present invention. The most advantageous fuels from an economic standpoint are the saturated and unsaturated hydrocarbons, particularly the saturated hydrocarbons, i.e., the alkanes. The preferred alkanes contain from one to 16 carbon atoms which can be straight or branch-chained or cyclic molecules or mixtures thereof. Further, any of the known oxidizing agents can be employed at the cathode of the fuel cells of the invention. The preferred oxidants are air and oxygen.

A fuel cell is constructed substantially as shown in the drawing wherein the electrolyte disk E is a cast thallium oxide disk. The disk is in contact with an anode of nickel foil and a cathode of gold foil. When operated at a temperature of 250°C and fed with air as the oxidant and a mixture of hydrocarbons containing from one to eight carbon atoms as the fuel, the cell provided current density characteristics as follows:

| Volts | Current Density (Ma/cm$^2$) |
|---|---|
| 0.9 | 0.8 |
| 0.7 | 12. |
| 0.4 | 16. |

In the above example, various modifications can be made in the cell structure. Thus, an anode or cathode can be replaced by thin screen type electrodes. As will be apparent to one skilled in the art, the invention is not to be limited by the illustrative examples. It is possible to produce numerous modifications without departing from the inventive concept herein disclosed and covered by the appendant claims.

It is claimed:

1. A fuel cell comprising a fuel electrode, an oxidant electrode, and an active electrolyte in contact with said fuel electrode and said oxidant electrode, said active electrolyte consisting essentially of fused $Tl_2O$ and eutectics thereof.

2. The fuel cell of claim 1 wherein the $Tl_2O$ is contained in a porous carrier.

3. The fuel cell of claim 1 wherein the $Tl_2O$ is a cast disk containing up to about 15 percent of an inert solid.

4. The fuel cell of claim 3 wherein the inert solid is thorium oxide or cerium oxide.

5. A method of generating electricity in a fuel cell comprising a fuel electrode, an oxidant electrode, and fused active electrolyte consisting essentially of $Tl_2O$ and eutectics thereof in contact with said fuel and oxidant electrodes, comprising the steps of feeding air to the oxidant electrode, feeding impure hydrogen or a carbonaceous fuel to the fuel electrode, and maintaining the temperature of the cell in the range of from about 120° to 300°C. while removing current through an external circuit.

6. The method of claim 5 wherein the $Tl_2O$ is contained in a porous carrier.

7. The method of claim 5 wherein the $Tl_2O$ is a cast disk containing up to about 15 percent of an inert solid.

8. The method of claim 7 wherein the insert solid is thorium oxide or cerium oxide.

* * * * *